US009372304B2

(12) United States Patent  
Bradley et al.

(10) Patent No.: US 9,372,304 B2  
(45) Date of Patent: Jun. 21, 2016

(54) APPARATUS FOR ALIGNMENT OF A MULTICORE FIBER IN A MULTIFIBER CONNECTOR AND METHOD OF USING SAME

(71) Applicants: Kelvin B Bradley, Lawrenceville, GA (US); Wladyslaw Czosnowski, Duluth, GA (US); Tristan Kremp, Somerset, NJ (US); Yue Liang, Peachtree City, GA (US)

(72) Inventors: Kelvin B Bradley, Lawrenceville, GA (US); Wladyslaw Czosnowski, Duluth, GA (US); Tristan Kremp, Somerset, NJ (US); Yue Liang, Peachtree City, GA (US)

(73) Assignee: OFS FITEL, LLC, Norcross, GA (US)

( * ) Notice: Subject to any disclaimer, the term of this patent is extended or adjusted under 35 U.S.C. 154(b) by 132 days.

(21) Appl. No.: 14/227,560

(22) Filed: Mar. 27, 2014

(65) Prior Publication Data  
US 2014/0294350 A1 Oct. 2, 2014

Related U.S. Application Data

(60) Provisional application No. 61/806,152, filed on Mar. 28, 2013.

(51) Int. Cl.  
*G02B 6/38* (2006.01)  
*G02B 6/00* (2006.01)  
*G02B 6/02* (2006.01)

(52) U.S. Cl.  
CPC .......... *G02B 6/02042* (2013.01); *G02B 6/3885* (2013.01)

(58) Field of Classification Search  
USPC ............................................. 385/78–88, 147  
See application file for complete search history.

(56) References Cited

U.S. PATENT DOCUMENTS

| | | | |
|---|---|---|---|
| 6,456,369 B1 * | 9/2002 | Ohki | G02B 6/3807 356/73.1 |
| 8,041,173 B2 * | 10/2011 | Imamura | G02B 6/02042 385/125 |
| 2005/0169571 A1 * | 8/2005 | Kaneko | B82Y 20/00 385/14 |
| 2014/0205241 A1 * | 7/2014 | Nielson | G02B 6/3877 385/66 |

* cited by examiner

*Primary Examiner* — Akm Enaayet Ullah  
(74) *Attorney, Agent, or Firm* — Jacobs + Kim LLP

(57) ABSTRACT

A multicore fiber alignment apparatus is described, having a chassis into which is mounted ferrule-holding means for holding a multicore fiber ferrule having one or more capillaries extending therethrough. Fiber-holding means for holding one or more multicore fibers in position to be mounted into the ferrule, such that each multicore fiber extends through a respective ferrule capillary. Means are provided for monitoring the rotation angle of each multicore fiber within its respective capillary, relative to a reference rotational orientation. Means are further provided for rotating each of the multicore fibers within its respective capillary. The rotational orientation of each multicore fiber is fixed when its rotation angle is equal to zero.

14 Claims, 6 Drawing Sheets

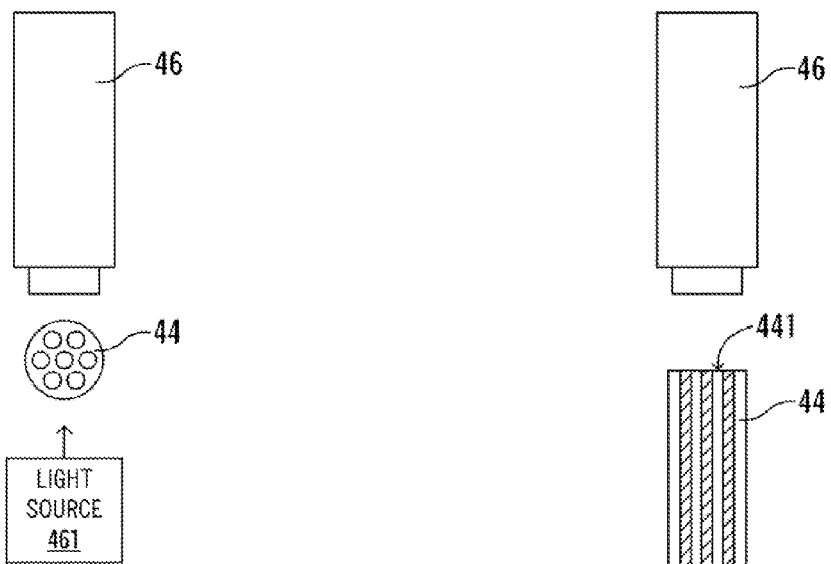
FIG. 7A
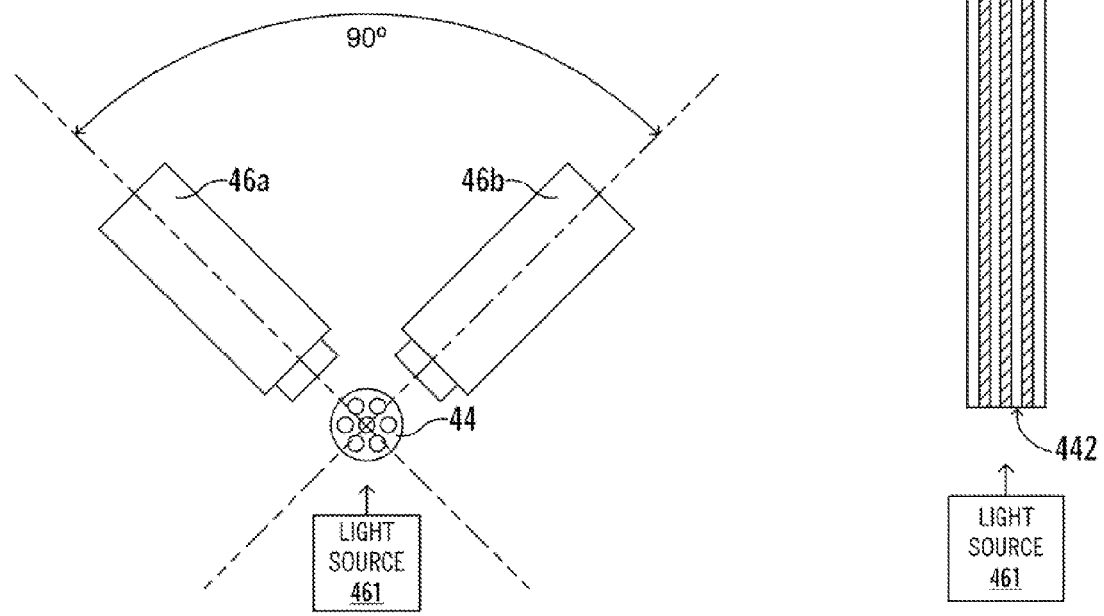
FIG. 7C
FIG. 7B

FIG. 9

START

↓

90

91: POSITION ONE OR MORE MULTICORE FIBERS SUCH THAT EACH MULTICORE FIBER EXTENDS THROUGH A RESPECTIVE CAPILLARY IN A MULTICORE FIBER FERRULE.

↓

92: VISUALLY MONITOR EACH MULTICORE FIBER TO DETERMINE ITS ANGLE OF ROTATION RELATIVE TO A REFERENCE ROTATIONAL ORIENTATION.

↓

93: ROTATE EACH MULTICORE FIBER WITHIN ITS RESPECTIVE CAPILLARY UNTIL IT ACHIEVES AN ALIGNED ROTATIONAL ORIENTATION, WHEREIN THE ANGLE OF ROTATION OF THE FIBER RELATIVE TO THE REFERENCE ROTATIONAL ORIENTATION EQUALS ZERO, WITHIN TOLERANCE.

↓

94: FIX THE ROTATIONAL ORIENTATION OF EACH MULTICORE FIBER WHEN ITS ANGULAR ROTATION IS IN ALIGNMENT WITH THE REFERENCE ROTATIONAL ORIENTATION, WITHIN A SELECTED TOLERANCE.

APPARATUS FOR ALIGNMENT OF A MULTICORE FIBER IN A MULTIFIBER CONNECTOR AND METHOD OF USING SAME

CROSS REFERENCE TO RELATED APPLICATIONS

The present application claims the priority benefit of U.S. Prov. Pat. App. Ser. No. 61/806,152, filed on Mar. 28, 2013, which is owned by the assignee of the present application, and is incorporated herein by reference in its entirety.

INCORPORATION BY REFERENCE

The following patent application is incorporated herein by reference in its entirety:

"Multifiber Connectors for Multicore Optical Fiber Cables," U.S. patent application Ser. No. 13/049,794, filed on Mar. 16, 2011, which is owned by the assignee of the present application.

BACKGROUND OF THE INVENTION

1. Field of the Invention

The present invention relates generally to the field of fiber optics, and in particular to structures for providing aligned connectorization for multicore optical fibers.

2. Background Art

Multicore fiber (MCF) technology has the potential of greatly increasing the capacity of current optical fiber networks by allowing a plurality of optical data signals to be carried in parallel by a single fiber. MCFs have been developed that have a diameter that is equal to, or close to, that of a single-core fiber. The use of these MCFs in place of single-core fibers increases patching densities without jeopardizing optical performance or introducing fiber management issues.

One important technical issue to be addressed is connectorization, i.e., how to suitably terminate MCF cables such that they exhibit an acceptably low level of insertion loss. MCFs currently under development must have an insertion loss that is low enough to support data communication applications typically requiring 2 to 4 connections. Data center and enterprise structured cabling systems typically require a mean insertion loss of 0.3 dB, with a standard deviation of 0.2 dB, and maximum insertion loss of 0.75 dB.

SUMMARY OF INVENTION

An aspect of the invention is directed to a multicore fiber alignment apparatus, comprising a chassis into which are mounted a number of alignment components. Means are provided for holding a multicore fiber ferrule having one or more capillaries extending therethrough. Fiber-holding means are provided for holding one or more multicore fibers in position to be mounted into the ferrule, such that each multicore fiber extends through a respective ferrule capillary. The rotation angle of each multicore fiber within its respective capillary is monitored, relative to a reference rotational orientation. Means are further provided for rotating each of the multicore fibers within its respective capillary. The rotational orientation of each multicore fiber is fixed when its rotation angle is equal to zero, i.e., when its rotational orientation is equal to the reference rotational orientation.

BRIEF DESCRIPTION OF THE DRAWINGS

FIGS. 7A-7C show a series of diagrams of alternative machine vision configurations for use in the apparatus shown in FIG. 4.

FIG. 9 shows a flowchart of a general multicore fiber alignment technique according to a further aspect of the invention.

DETAILED DESCRIPTION

Aspects of the present invention are directed to systems and techniques for providing aligned connectorization for multicore fibers.

The structures and techniques described herein take advantage of the MM-MCF design by increasing the volume of data transmitted by a single fiber strand or, equivalently, reducing the number of fibers required to provide a certain total bandwidth. To satisfy the demand for higher bandwidth, the current solution is to increase the number of transmission fibers, which takes up more space and makes system breaks more likely.

Figure 1:
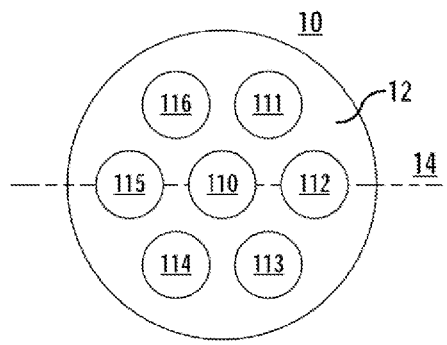
FIG. 1 shows an endface view of an exemplary multimode multicore fiber used to illustrate aspects of the invention.

FIG. 1 shows an endface view of an exemplary multimode multicore fiber (MM-MCF) 10, described in detail in U.S. patent application Ser. No. 13/045,064, which is owned by the assignee of the present application and which is incorporated herein by reference in its entirety.

Aspects of the invention are described with respect to MM-MCF 10. However, it will be appreciated that the present invention may also be practiced using other types of MCFs, including MCFs having different numbers of cores, different types of cores or claddings, and different core configurations, which may or may not be symmetric with respect to the fiber axis. Also, the MCF fiber could be twisted, such that each of its cores forms a helix within the fiber around the fiber axis. If the considered core is centered on the fiber axis, i.e., if it is a center core, the diameter of this helix is zero.

MM-MCF 10 comprises seven graded-index cores 110-116, produced from seven graded-index LaserWave fiber core rods using a stack-and-draw process. The cores are arranged in a hexagonal array including a center core 110 and six outer cores 111-116 that extend through a shared cladding 12. The diameter of each of the cores is ~27 µm, and the core pitch is ~37 µm. The cladding diameter is 125 µm and the acrylate dual coating layer (not shown) is 250 µm.

Although MCFs, such as the fiber 10 illustrated in FIGS. 1A and 1B, are not yet commercially available, there are active development efforts to make MCF commercially available in the near future because MCF is one of the solutions to address the need for increased data transmission capacity and reduced space for fiber optic cables and other transmission media.

Figure 2:
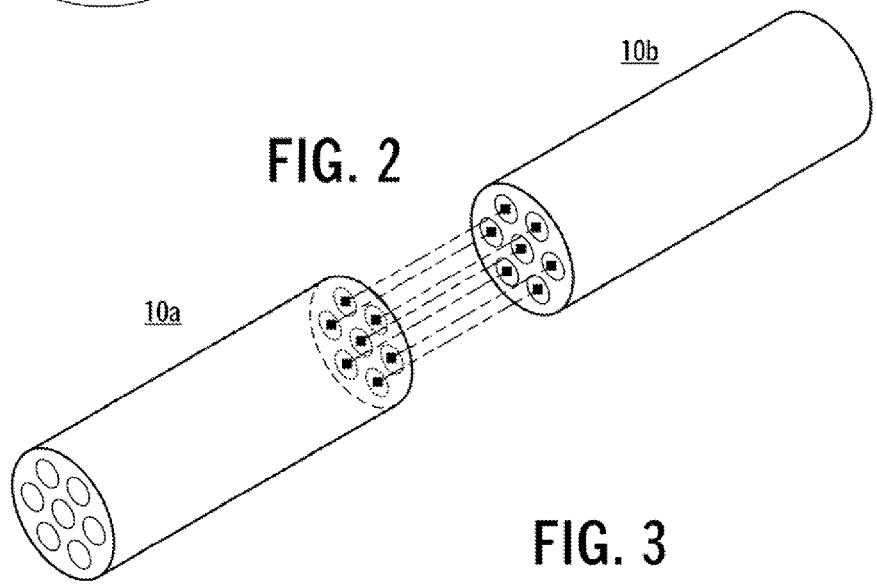
FIG. 2 shows an isometric view of first and second multicore fiber segments to be connected together.

FIG. 2 is an isometric diagram illustrating the connection of a first MM-MCF segment 10a to a second MM-MCF segment 10b. When connecting a segment of MM-MCF 10 to a second MM-MCF segment, care must be taken to ensure precise alignment for respective pair of MM-MCF cores. Failure to achieve proper alignment can result in unacceptably high levels of insertion loss.

Positioning of a fiber having a single core is relatively easy because the single core is typically centered at the fiber axis. In such a fiber, generally speaking, rotational orientation is irrelevant. The same is not true for an MCF. In MM-MCF 10, only one out of the seven cores is located at the fiber axis. Thus, in a given data transmission application, most if not all of the active cores will be "satellite" cores, i.e., cores located away from the fiber axis.

For the purposes of the present description, the rotational orientation of a given segment of MM-MCF 10 is measured relative to arbitrarily positioned x- and y-axes, with the MM-MCF segment centered at the origin. The rotational orientation of the segment is quantified as the angle $\phi$ between the x-axis and an imaginary line 14 (FIG. 1) passing through the segment's center core 110 and two satellite cores 115 and 112. It is noted that others techniques and conventions may be used to describe rotational orientation.

Figure 3:
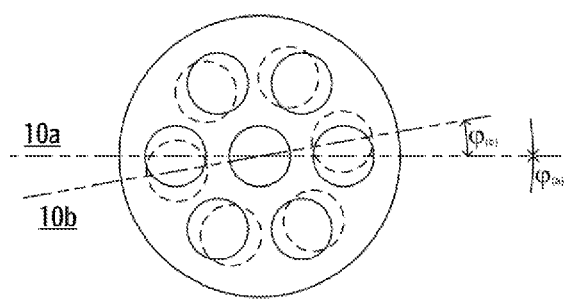
FIG. 3 shows a diagram illustrating first and second multicore fiber segments having different angles of rotation relative to a reference rotational orientation.

FIG. 3 is a diagram illustrating a rotational misalignment between the cores at the endface of the first MM-MCF segment 10a and the cores at the endface of the second MM-MCF segment 10b (shown in broken lines). In FIG. 3, the first MM-MCF segment 10a is depicted as having a rotational orientation in which $\phi_{(a)}=0$. The second MM-MCF segment 10b is depicted as having a rotational orientation in which $\phi_{(b)}=10°$.

It is noted that the respective endfaces of first and second multicore fibers to be connected to each other must have core configurations that are mirror images of each other in order for all of the cores of the first fiber to be properly aligned with all of the cores of the second fiber.

The cores need to be precisely clocked to mate with the corresponding cores of the mating connector. This requires a system able to recognize the position of the cores before the alignment takes place and then able to move the fiber to the proper position. The moving system has to be able to align cores with their nominal positions within a certain amount of tolerance (e.g., ±1°) to meet the connector loss requirement. In other words, $|\phi_{(a)}|, |\phi_{(b)}| \leq 1°$, where $|\phi_{(a)}|, |\phi_{(b)}|$ are the moduli (absolute values) of $\phi_{(a)}, \phi_{(b)}$.

The high number of cores to be aligned exacerbates the problem. The connector is rejected if even a single channel does not meet the loss requirement. The channel loss is a function of the quality of the alignment of the cores. Manipulating individual fibers for multicore alignment is difficult given the 250 μm center-to-center pitch between adjacent fibers and the required alignment precision (no side-to-side space).

Further, an MCF may have a core configuration in which the outer cores of the MCF are helically twisted around the fiber's longitudinal axis. A twisted core configuration makes pre-alignment difficult because the rotational orientation of the cores at a cleaved endface depends upon its axial location.

An aspect of the invention is directed to a multifiber mechanical transfer (MT) connectorization system for MM-MCFs, in which a vision-based approach is employed to achieve precise and repeatable positioning of the transmitting channels in commercially available MT-type optical connectors. The proper positioning of all fibers in an MT connector is required in order to meet the performance criteria of the connectorized assembly.

A multifiber MCF connector addresses the space issue in data centers by reducing the volume of fiber being used. At the same time, it will allow for an increased volume of data transfer. MM-MCF 10 and the connectorization system described herein are designed to be backward-compatible with previous MT cable assembly deployments.

Figure 4:
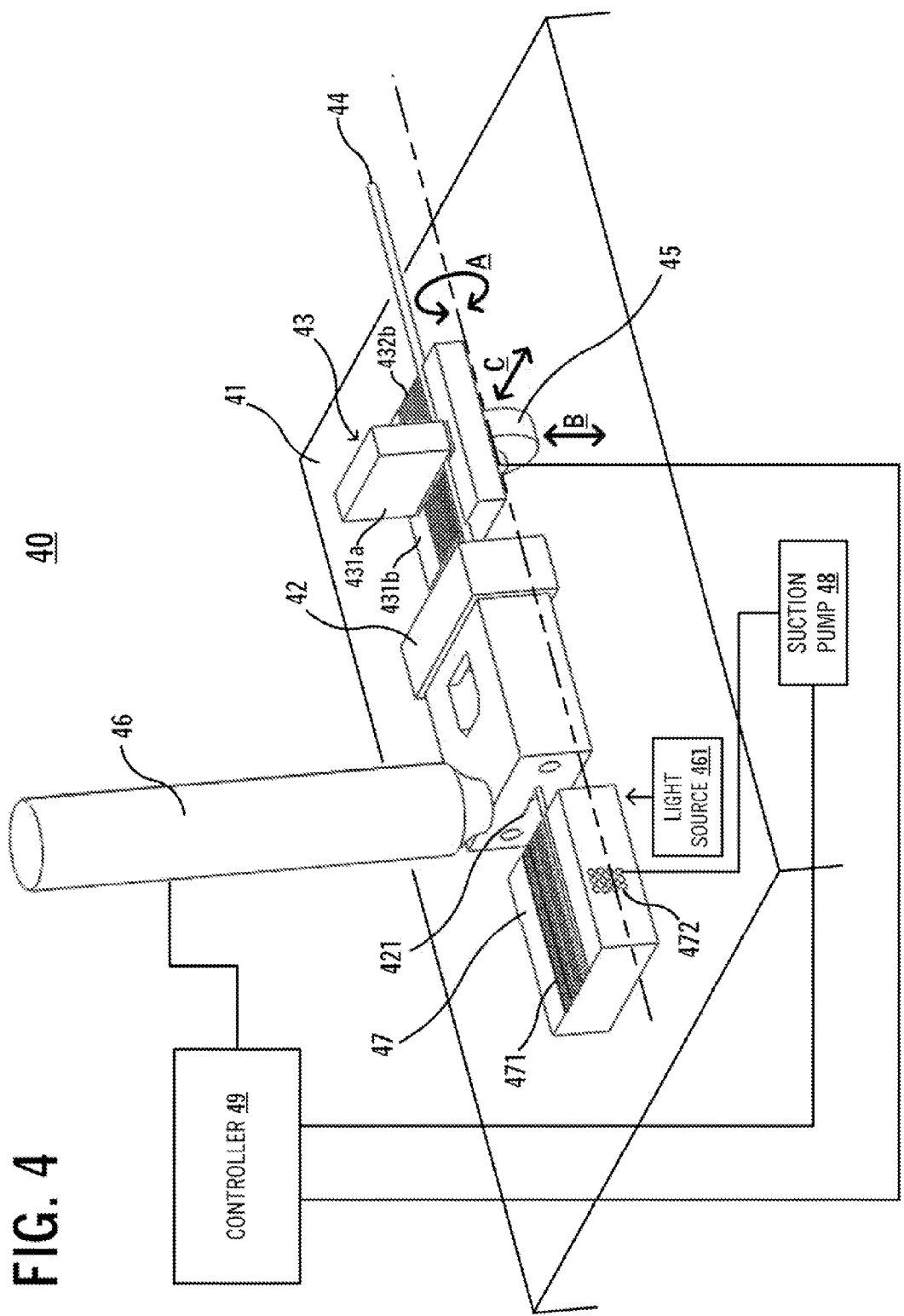
FIG. 4 shows a diagram illustrating an exemplary practice of a multicore fiber alignment apparatus according to an aspect of the invention.

FIG. 4 shows a diagram of a multicore fiber alignment apparatus 40 according to an aspect of the system. Apparatus 40 comprises a chassis 41, to which the following components are mounted:

ferrule-holding means for holding a multicore fiber ferrule 42 having one or more capillaries 421 extending therethrough;

fiber-holding means 43 for holding one or more multicore fibers 44 in position to be mounted into the ferrule 42, such that each multicore fiber extends through a respective ferrule capillary 421;

an indexing wheel assembly 45, rotatable (as indicated by arrow A) around an axis that is parallel to the fiber axes, for rotating each of the multicore fibers 44 within its respective capillary 421;

a camera 46 and light source 461, or the like, for monitoring the rotational orientation of each multicore fiber within its respective capillary, relative to a reference rotational orientation;

a suction block 47 and suction pump 48, or like means, for fixing the rotational orientation of each multicore fiber 44 when its angular rotation is aligned with the reference rotational orientation, within a selected tolerance; and a microprocessor controller 49.

In an exemplary practice of the invention, one or more MCFs 44 to be connectorized are stripped and threaded through respective capillaries 421 in MT ferrule 42 and held in place by fiber-holding means 43.

Figure 5:
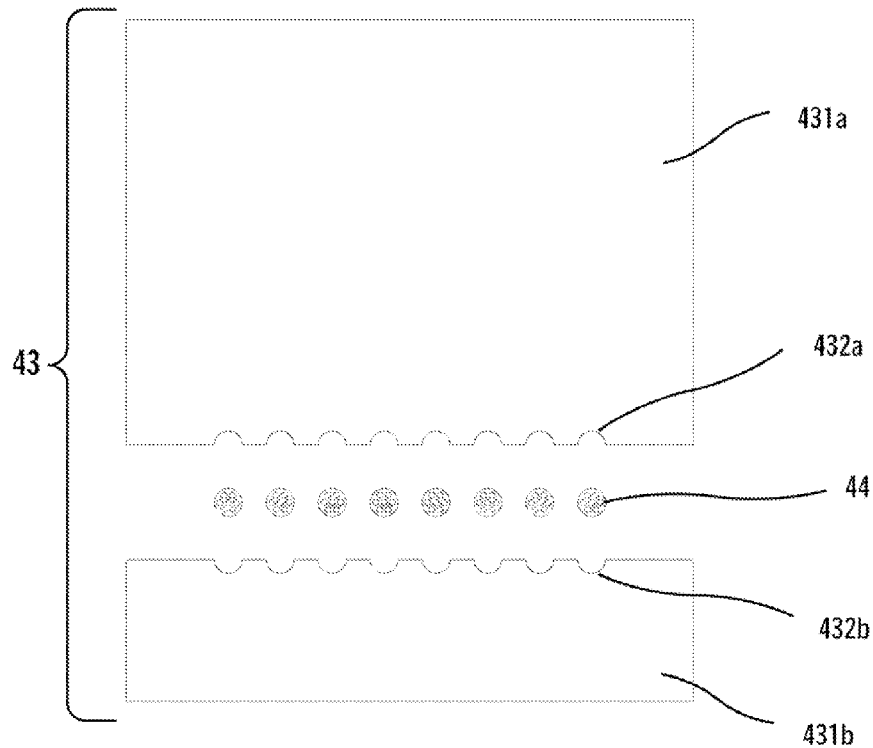
FIG. 5 shows a diagram of an exemplary implementation of a fiber-holding arrangement for use in the apparatus shown in FIG. 4.

FIG. 5 shows an end view of an exemplary implementation of the fiber-holding means 43, comprising matching upper and lower blocks 431a and 431b. Each block is provided with a set of matching grooves 432a and 432b. When the upper and lower blocks are brought into contact with each other, the matching grooves 432a and 432b form an array of channels that are shaped to closely receive a corresponding plurality of MCFs.

Controller 49 (FIG. 4) rotates each MCF 44 by means of the indexing wheel assembly 45.

Figure 6:
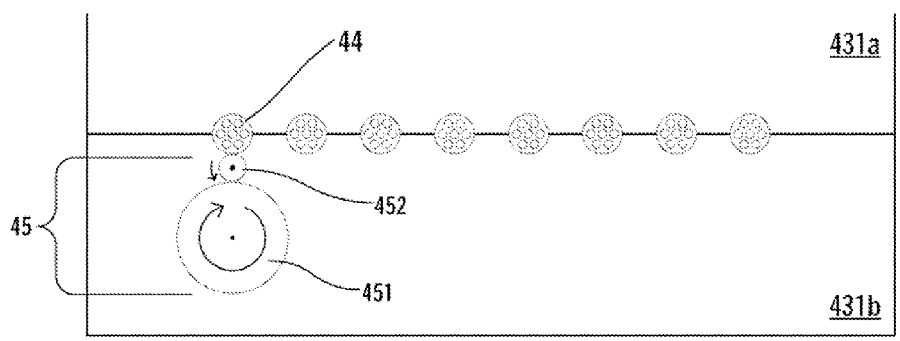
FIG. 6 shows a diagram of an exemplary implementation of an indexing wheel assembly for use in the apparatus shown in FIG. 4.

FIG. 6 shows a diagram of an exemplary implementation of an indexing wheel assembly 450, comprising an indexing wheel 451 that is rotated by a driving wheel 452. In the depicted implementation, the position of the indexing wheel assembly 450 is adjustable both up-and-down and side-to-side (indicated respectively by arrows B and C in FIG. 4). However, the axis of rotation of the indexing wheel is fixed in a parallel orientation relative to the fiber axis. Otherwise, turning the indexing wheel would apply axial force to the fiber and potentially shift the fiber along the groove in which it is seated.

Further, the plane spanned by the axis of the fiber currently being aligned and the rotational axis of the indexing wheel should be perpendicular to the plane spanning the respective axes of all of the fibers in the MCF array. This arrangement prevents accidental rotation of two fibers at once.

Before a given MCF 44 is rotated, the indexing wheel assembly 450 is moved such that the periphery of the driving wheel 452 comes in contact with the fiber 44. After the fiber 44 has been rotated to the proper position and secured, the indexing wheel assembly 450 moves off and indexes to the next fiber.

Returning to FIG. 4: the position of the fiber 44 is verified during rotation using a machine vision-based approach, in which, e.g., a camera 46 and light source 461 are used to generate image data that is transmitted to controller 49, which uses the image data to determine the rotational orientation of fiber 44. Controller 49 sends a signal to the rotating wheel 45, instructing it to stop when the proper rotational orientation of the fiber is achieved.

FIGS. 7A and 7B show alternative configurations of a one-camera machine vision subsystem for use in the system shown in FIG. 4. In the configuration shown in FIG. 7A, camera 46 is positioned transversely to the fiber axis, such that it looks across the fiber axis, with light source 461 positioned opposite camera 46, on the other side of the MCF 44. In the configuration shown in FIG. 7B, the camera 46 is positioned at a first cleaved fiber endface 441, such that it looks along the fiber axis, with light source 461 positioned at a second fiber endface 442.

FIG. 7C shows a two-camera machine vision configuration in which first and second cameras 46a and 46b are positioned transversely to the fiber axis, spaced 90 degrees apart (i.e., with the cameras positioned at ±45 degrees relative to vertical). The two-camera configuration is useful with respect to a complicated MCF structure for detecting the core profiles and making alignment more efficient and quick.

It is noted that other machine vision configurations that allow to measure the rotational orientation of the fibers can be used in conjunction with the practices of the invention described herein. For example, the radiation that is emitted by the light source or sources and detected by the camera or cameras does not necessarily have to be light in the visible wavelength range. Non-visible radiation, such as near infrared or ultraviolet radiation, could also be used with suitable detectors. For the purposes of the present description, it will be understood that the terms "visual" and "visually monitoring" are used to refer to light at all wavelengths that are detectible by a machine vision system, including light at wavelengths that are visible to humans, as well as infrared and ultraviolet wavelengths.

Figure 8:
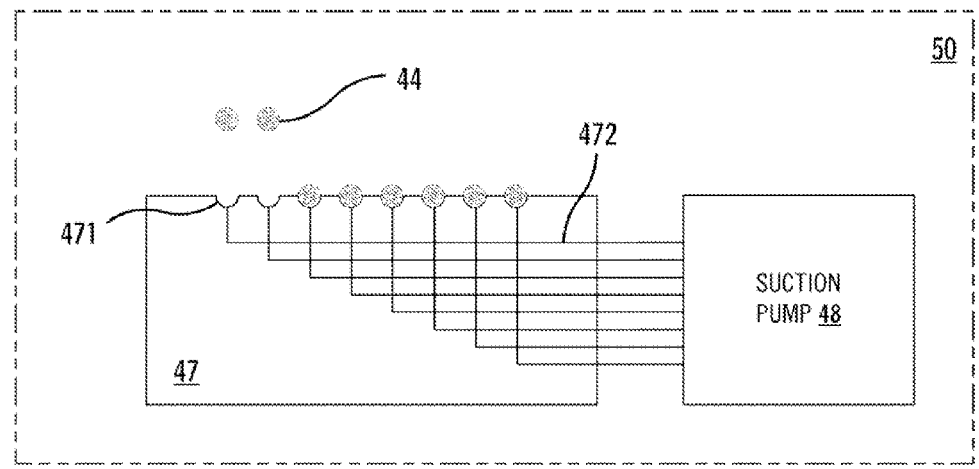
FIG. 8 shows a diagram of an exemplary implementation of a suction block and suction pump for use in the FIG. 4 apparatus shown in FIG. 4.

FIG. 8 is a diagram of an exemplary implementation of a fiber-holding subassembly 50, comprising suction block 47 and suction pump 48. The function of fiber-holding subassembly 50 is to selectably maintain the rotational orientation of each MCF 44 after it has been rotationally aligned by creating a differential between the atmospheric pressure at the upper portion of the MCF and the suction-induced lower pressure at the lower portion of the MCF. It is noted that fiber-holding subassembly 50 may be implemented using other structures and techniques known in the art.

Suction block 47 comprises a plurality of grooves 471 that are shaped to receive the lower halves of a corresponding array of MCFs 44. Each groove 471 includes one or more holes that provide an opening into a respective conduit 472 leading to suction pump 48. Suction block 47 and suction pump 48 are configured such that suction is applied independently to each MCF 44. Thus, individual MCFs 44 can be held in place in their respective grooves 471, while allowing the other MCFs 44 to rotate freely.

As each MCF 44 is rotationally aligned, controller 49 fixes the rotational orientation of the MCF 44 by sending a suitable signal to the suction pump 48, which operates to create a pressure differential between the atmospheric pressure at the top of the fiber and a lower pressure at the bottom of the fiber.

Controller 49 rotates each MCF 44 one by one until it is rotationally aligned with respect to the reference rotational orientation. Once each fiber is rotationally aligned, suction block 47 maintains the rotational orientation of the fiber as the indexing wheel assembly is moved to the next fiber to be aligned. This process continues until all of the fibers in the connector are aligned. A suitable adhesive, such as epoxy, can be cured in order to permanently fix the position of each MCF within its respective capillary.

In one practice of the invention, adhesive is applied in a two-step process. In a first step, a quick-curing adhesive is applied to the fiber while it is still in the alignment jig. In a second step, a heat-curing adhesive, such as epoxy, is applied after the fiber has been removed from the alignment jig.

The proposed alignment method eliminates intermediary alignment steps and therefore improves the quality of the alignment. Ferrule 42 becomes a part of the finished mating connector after all alignment steps are completed and the fibers are epoxied in place.

The information from the vision system employed in this method is used to optimize the position of the fiber by controlling the rotation of the indexing wheel 45. Typically, it would utilize an intensity pattern matching software to determine the current position of the cores, i.e., the angle of rotation of the fiber, relative to a prescribed reference position (i.e., angle of rotation). This reference orientation can be arbitrarily chosen, but is preferably the same for all fibers to be connectorized. The software can use any algorithm or method that is suitable to determine the current angle difference between the fiber and the reference orientation.

As an example, the current angle may be determined by least-squares fitting the currently measured intensity pattern with a library of intensity patterns that show the fiber for certain known rotation angles (e.g., 1-degree equispaced, relative to the reference orientation). The current angle is approximated by finding the rotation angle having a library intensity pattern that minimizes a selected norm (e.g., root mean square) of the difference between the currently measured intensity pattern and each of the library intensity patterns. If necessary, a finer angular resolution can be achieved by interpolation and an iterative numerical algorithm such as the Levenberg-Marquardt method.

The indexing wheel needs to be rotated until the current rotation angle □ of the fiber is equal, or substantially equal, to zero, i.e., when the best fit is given by the prescribed reference orientation.

As used herein, the term "substantially equal" refers to values that are sufficiently close to each other to achieve a desired result (e.g., an acceptably small amount of loss). For the purposes of the present description, it will be understood that the term "equal to" is used to refer inclusively to values that are exactly equal to each other, as well as to values that are substantially equal to each other.

In an exemplary practice of the invention, rotation angles are measured in the interval [−180°, +180°] or [0°, 360°], with a targeted accuracy of 0.5 degrees.

If the indexing wheel and the fiber have the diameters D and d, respectively, and slippage between them can be neglected, then the modulus of the angle to be applied to the wheel is □d/D. However, due to imperfections such as backlash and torsion along the fiber, the resulting angle at the fiber tip may still be nonzero. Therefore, the described procedure (determination of the current angle, then rotating the indexing wheel appropriately to null it) may have to be repeated a few times to meet the required angular tolerance.

Alternatively, the rotation angle □ of the fiber may also be tracked continuously (using the described fitting procedure or some other suitable method) while the indexing wheel is turning. In this case, only a stop signal needs to be sent to the indexing wheel when □=0 (within tolerance) is achieved.

It is further noted that, in the exemplary practice described above, the MCFs are rotated and monitored one at a time. It would also be possible to practice the invention according to a technique in which two or more MCFs, or all of the MCFs in a given array, are rotated and monitored simultaneously.

Although MCF core alignment in a MT connector is described herein, the present invention is equally applicable to other types of connectors such as LC, SC, ST, and FC. Also, the alignment device and methods of aligning MCF cores within a connector equally work for a connector with a single MCF as well as a connector that accommodates a plurality of MCFs as described here. Furthermore, the alignment device and methods of aligning MCF cores within a connector equally work for single-mode MCFs as well. Even for those single-mode fibers that are supposed to be axially symmetric, imperfections such as concentricity errors of the cores or the cladding within the coating can make the described rotational orientation optimization useful.

FIG. 9 shows a flowchart illustrating a general multicore fiber alignment technique 90 according to the invention. Technique 90 comprises the following steps:

91: Position one or more multicore fibers such that each multicore fiber extends through a respective capillary in a multicore fiber ferrule.

92: Visually monitor each multicore fiber to determine its angle of rotation relative to a reference rotational orientation.

93: Rotate each multicore fiber within its respective capillary until it achieves an aligned rotational orientation, wherein the angle of rotation of the fiber relative to the reference rotational orientation equals zero, within tolerance.

94: Fix the rotational orientation of each multicore fiber when its angular rotation is in alignment with the reference rotational orientation, within a selected tolerance.

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

What is claimed is:

1. A multicore fiber alignment method, comprising:
   (a) positioning one or more multicore fibers such that each multicore fiber extends through a respective capillary in a multicore fiber ferrule;
   (b) visually monitoring each multicore fiber to determine its angle of rotation relative to a reference rotational orientation;
   (c) rotating each multicore fiber within its respective capillary until it achieves an aligned rotational orientation, wherein the angle of rotation of the fiber relative to the reference rotational orientation equals zero, within tolerance; and
   (d) fixing the rotational orientation of each multicore fiber when its angular rotation is in alignment with the reference rotational orientation, within a selected tolerance.

2. The method of claim 1, wherein step (b) comprises utilizing intensity pattern matching to determine the current rotational orientation of the fiber cores relative to the reference orientation.

3. The method of claim 2, wherein the current rotational orientation of the fiber cores is determined by comparing the currently measured intensity pattern with a library of intensity patterns for known rotation angles.

4. The method of claim 3, wherein the current rotation angle is approximated by the rotation angle of the particular library intensity pattern that minimizes a norm of the difference between the currently measured intensity pattern and all library intensity patterns.

5. The method of claim 4, wherein a finer angular resolution can be achieved by interpolation and an iterative numerical algorithm.

6. The method of claim 5, wherein the known rotation angles are equispaced relative to the reference orientation.

7. The method of claim 1, wherein step (c) includes using an indexing wheel to rotate each of the multicore fibers.

8. The method of claim 7, wherein step (c) includes using a driving wheel to rotate the indexing wheel.

9. The method of claim 1, wherein step (c) includes adjusting the position of the indexing wheel, such that when each multicore fiber is rotated, the axis of rotation of the indexing wheel is parallel to the multicore fiber.

10. The method of claim 1, where steps (b) and (c) are repeated to achieve a required angular tolerance.

11. The method of claim 1, wherein the rotation angle of the fiber is monitored continuously while the fiber is being rotated, and wherein the rotation of the wheel is stopped when the rotation angle is equal to zero, within tolerance.

12. The method of claim 1, wherein step (d) includes using a suction assembly to maintain the rotational orientation of each individual multicore fiber.

13. The method of claim 12, wherein, in step (d), the suction assembly comprises a block with an array of channels corresponding to the one or more multicore fibers, wherein each channel is provided with one or more conduit openings for applying a suction to a fiber seated within the channel.

14. The method of claim 1, wherein step (d) includes maintaining the rotational orientation of each multicore fiber until an epoxy applied to the multicore fiber is cured so as to permanently fix its rotational orientation.

* * * * *